United States Patent [19]

Price

[11] 4,149,836

[45] Apr. 17, 1979

[54] APPARATUS FOR PRODUCING PARTICULATE SULFUR

[75] Inventor: Harold A. Price, Orange, Calif.

[73] Assignee: F. E. Wingate, Fresno, Calif.

[21] Appl. No.: 854,903

[22] Filed: Nov. 25, 1977

Related U.S. Application Data

[63] Continuation-in-part of Ser. No. 561,937, Mar. 25, 1975, abandoned.

[51] Int. Cl.$^2$ .............................................. B22D 13/00
[52] U.S. Cl. .............................................. 425/8; 264/8
[58] Field of Search .................... 425/8; 264/8; 261/84

[56] References Cited

U.S. PATENT DOCUMENTS

| | | | |
|---|---|---|---|
| 1,498,717 | 6/1924 | Coffin | 425/8 X |
| 1,560,527 | 11/1925 | Bassler | 261/84 |
| 1,601,897 | 10/1926 | Wiley et al. | 425/8 X |
| 1,603,559 | 10/1926 | Schwantes | 264/8 |
| 3,272,893 | 9/1966 | Mogensen | 264/8 |
| 3,329,746 | 7/1967 | Joyce et al. | 425/8 X |
| 3,442,988 | 5/1969 | Williams | 264/8 |
| 3,588,950 | 6/1971 | Marshall | 425/8 X |

*Primary Examiner*—Robert L. Spicer, Jr.
*Attorney, Agent, or Firm*—Christie, Parker & Hale

[57] ABSTRACT

Molten sulfur is fed at a controlled flow rate into a spinning vessel located in an enclosure. A ring of sulfur ejecting nozzles each have an inlet communicating with a conduit that extends tangentially from the periphery of the vessel interior and an outlet communicating with the air in the enclosure. As the sulfur is ejected from the nozzles, it is atomized. The atomized sulfur is further cooled to form solid particles before appreciable agglomeration takes place by fans on both sides of the ring of nozzles into which cooling water is ejected and evaporated. Each nozzle has a deflector at its outlet, and adjustable protrusions that interrupt the flow at the nozzle outlet to control the particle size. The solid particles are removed from the enclosure, thoroughly mixed with a substantial quantity of air, and then separated from the air by a cyclone centrifugal separator.

9 Claims, 3 Drawing Figures

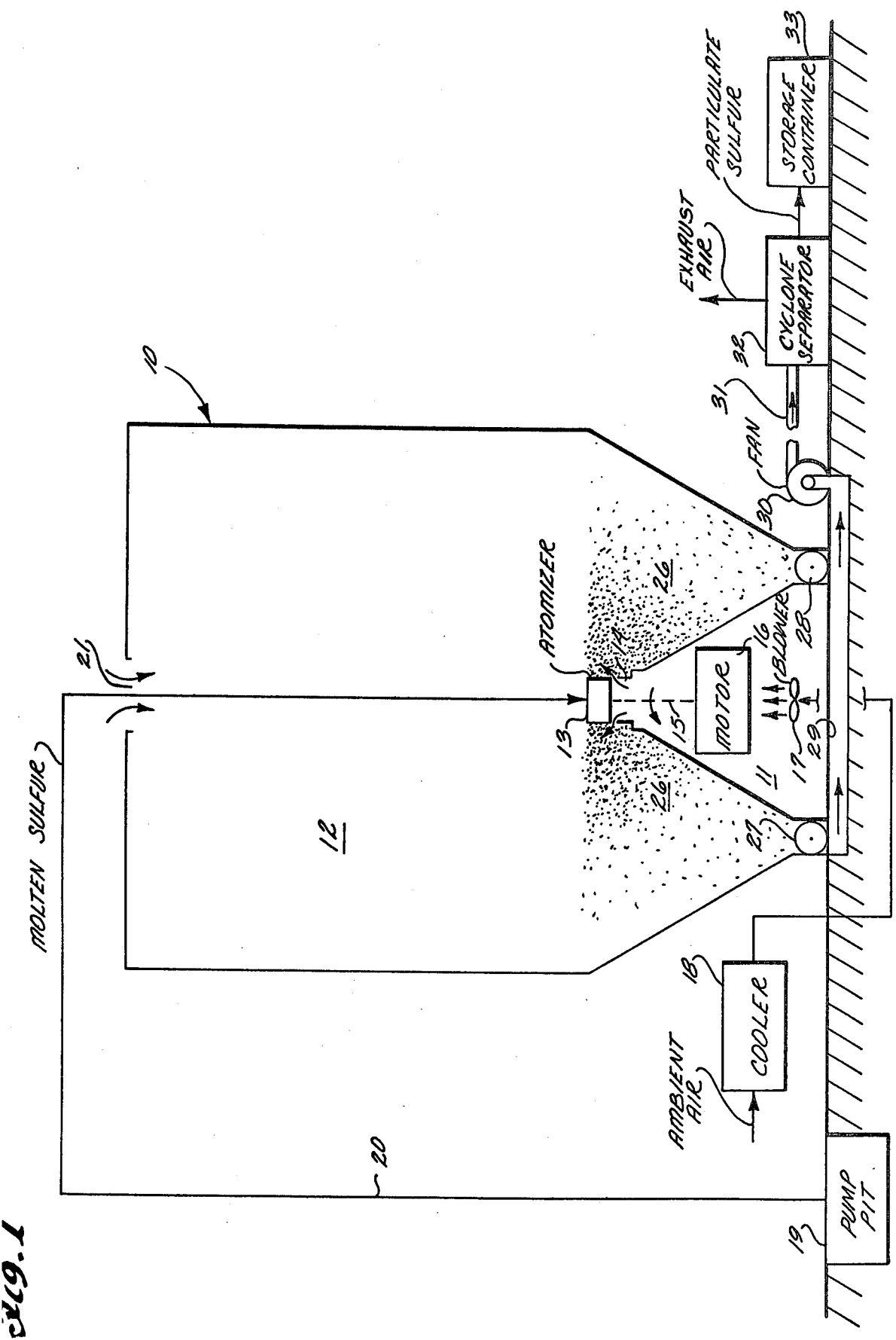

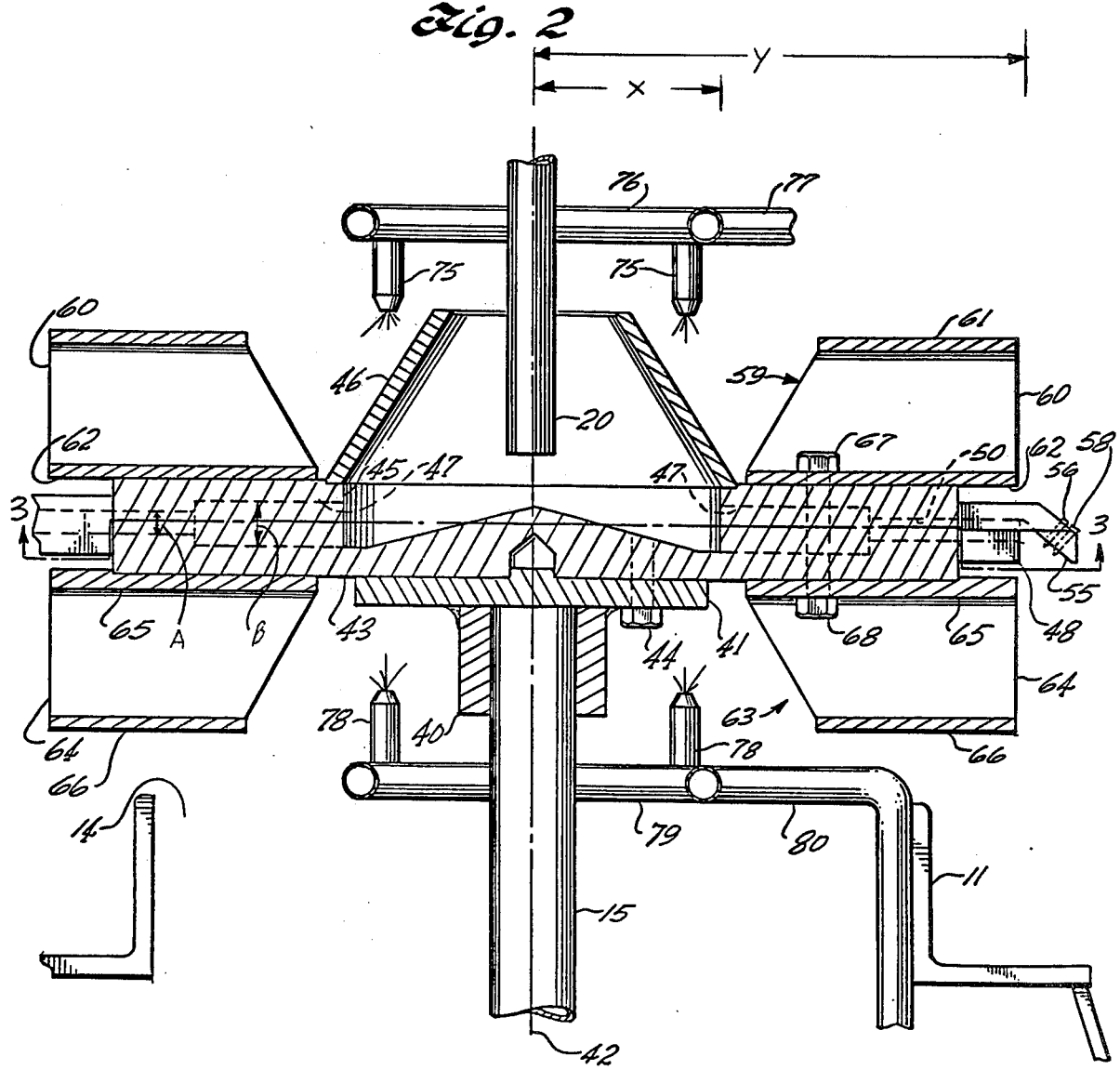

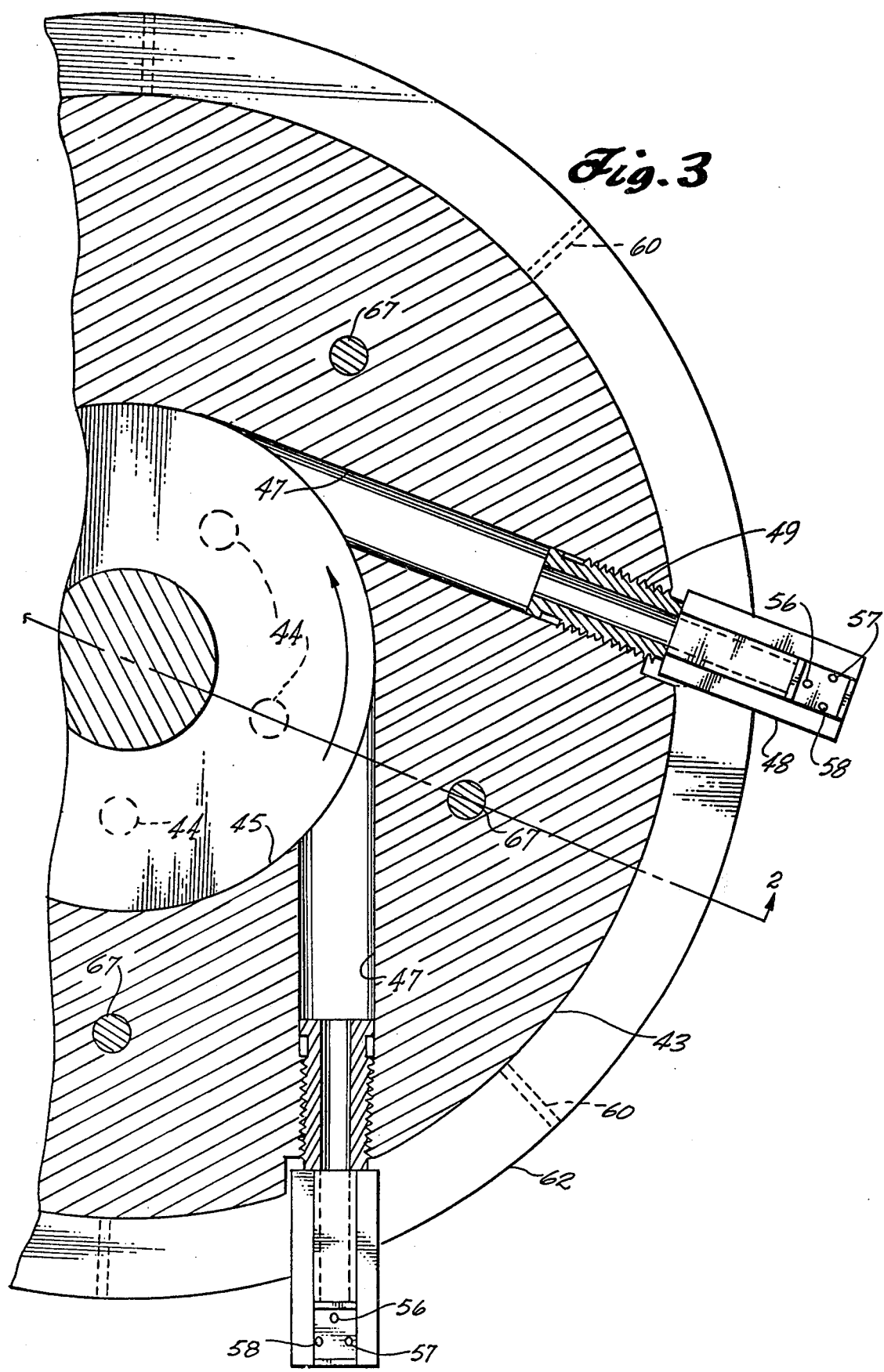

APPARATUS FOR PRODUCING PARTICULATE SULFUR

CROSS REFERENCE TO RELATED APPLICATIONS

This is a continuation-in-part of application Ser. No. 561,937, filed Mar. 25, 1975, now abandoned.

BACKGROUND OF THE INVENTION

This invention relates to the production of particulate sulfur and, more particularly, to apparatus for transforming molten sulfur into solid particles of controlled size on a continuous basis.

Solid particulate sulfur has many industrial and agricultural applications. The desired particle size depends upon the particular application. For example, sulfur spread on soil by a mechanical spreader typically would have a particle size of 20 mesh minus, and sulfur employed for insecticides or rubber production typically would have a particle size of 325 mesh minus.

The conventional way to produce sulfur in particulate form is to pour molten sulfur on a concrete slab or a water cooled metal or rubber conveyor belt, thereby forming a solidified layer of sulfur, which is broken up into lumps or flakes by mechanical means such as a crusher or bucket loader. Before reducing the lumps or flakes to the desired fine particle size, such as 325 mesh minus, they must be aged for a substantial period of time, e.g., from three to nine months, to develop a concise rhombic crystal structure that will be suitable and resist coalescing under the pressure of the mechanical milling required to produce the desired particle size.

Soil sulfur can be produced by feeding the lumps or flakes into a variety of crushers or mills. Sulfur in a form suitable for insecticides is generally produced by feeding aged sulfur particles into a roller mill. The milling operation is expensive, hazardous, and slow. To prevent explosions, the milling operation is carried out in an inert atmosphere such as combusted natural gas with an oxygen content reduced to about 3%. To prevent the particles of sulfur from coalescing due to the energy being expended, the temperature of the inert atmosphere during the milling operation must also be closely controlled by recycling through coolers and the like.

SUMMARY OF THE INVENTION

The invention is directed to apparatus for producing solid particulate sulfur of controlled size from molten sulfur by a relatively inexpensive, safe, and quick technique. The sulfur is not mechanically broken up or milled, and is not aged before reduction to its desired particle size. Molten sulfur is spun in an atomizer to impart thereto an outward motion. The spinning sulfur is ejected from the atomizer into a gaseous medium with sufficient force to atomize the sulfur. The atomized sulfur is rapidly cooled to form solid particles before it can agglomerate or coalesce. An inert gaseous medium is not required, because there is no mechanical action to generate heat or strike a spark; hence, there is little danger of explosion. For convenience, the gaseous medium would ordinarily be air.

A feature of the invention is a spinning atomizer having a central cavity and conduits extending tangentially outward from the cavity to eject molten sulfur into the gaseous medium surrounding the atomizer. Tangentially extending conduits impart a higher exit velocity to the molten sulfur than radial conduits. Thus, better atomization can be achieved with a motor having given power and speed characteristics.

Another feature of the invention is a spinning atomizer having a central cavity, elongated conduits extending outwardly from the cavity to eject molten sulfur into the gaseous medium surrounding the atomizer, and area reducing nozzles at the outputs of the conduits for converting static pressure of the sulfur to velocity. The length of the conduits is greater than the radius of the cavity. As a result, the molten sulfur is further atomized.

Another feature of the invention is an atomizer having a central cavity, conduits extending outwardly from the central cavity to eject molten sulfur, and a deflector disposed at the outlet of each conduit to intercept the stream of molten sulfur ejected therefrom. The deflector provides an impact zone for the molten sulfur which further enhances atomization.

Another feature of the invention is the provision of a fan directed to blow air through the sulfur particles ejected from the atomizer. Preferably, the fan comprises one or more sets of blades mounted on the atomizer to blow air across the ejected sulfur as the atomizer spins.

BRIEF DESCRIPTION OF THE DRAWINGS

The features of a specific embodiment of the best mode contemplated of carrying out the invention are illustrated in the drawings, in which:

FIG. 1 is a schematic diagram of apparatus for practicing the invention, including an atomizer;

FIG. 2 is a side sectional view of the atomizer of FIG. 1 taken through the plane indicated in FIG. 3; and FIG. 3 is a bottom sectional view of the atomizer of FIG. 1 taken through the plane indicated in FIG. 2.

DETAILED DESCRIPTION OF THE SPECIFIC EMBODIMENT

In FIG. 1, an enclosure 10 has a triangular prism-shaped chamber 11 maintained at a positive pressure and an overlying larger chamber 12 maintained at a negative, i.e., subatmospheric, pressure. Enclosure 10 has straight vertical end walls in the plane of the paper, not shown in FIG. 1. Thus, the horizontal cross section of the space within chambers 11 and 12 is rectangular. An atomizer 13, described below in detail in connection with FIGS. 2 and 3, lies in chamber 12 directly above an opening 14 at the top of chamber 11. Atomizer 13 is coupled by a shaft 15 to a motor 16 located in chamber 11. A positive pressure is maintained in chamber 11 by a blower 17, which draws ambient air outside enclosure 10 through a cooler 18 into chamber 11. The air in chamber 11 escapes through opening 14 into chamber 12 and serves to help cool the atomized sulfur produced by atomizer 13, in the manner described below in connection with FIGS. 2 and 3. Molten sulfur is supplied at a controlled rate to atomizer 13 from a pump pit 19 via a conduit 20, which enters chamber 12 through an opening 21 at the top of enclosure 10. Typically, molten sulfur could be gravity fed to pump pit 19 from a larger storage tank (not shown), heated to the desired temperature by steam coils in pump pit 19, and pumped through conduit 20 with a pump having a bypass to provide control of the flow rate of the molten sulfur and good turbulence within the pump pit. Typically, conduit 20 would comprise a steam traced and insulated pipe.

As atomizer 13 is rotatably driven by motor 16, the molten sulfur fed to it is thrown outwardly, atomized, and rapidly cooled to form solid particles, represented at 26. Two troughs are formed in chamber 12 by the upwardly converging sides of chamber 11 and the downwardly converging sides at the bottom of chamber 12. As the solid sulfur particles fall, they are directed by these troughs to screw conveyors 27 and 28 located at the bottom of chamber 12. Conveyors 27 and 28 transport the sulfur particles in the direction perpendicular to the paper to a large conduit 29 extending underneath one end of enclosure 10. Air and entrained sulfur particles are drawn from the bottom of chamber 12 through conduit 29 by a fan 30. A long, large conduit 31 connects fan 30 to a centrifugal separator 32, such as a cyclone separator. The exhaust air from separator 32 is discharged into the ambient air, and the particulate sulfur removed from the exhaust air by separator 32 is conveyed to a storage container 33.

Chamber 11 provides a safe, i.e., explosion proof, environment for motor 16 and any other equipment which may generate sparks, by virtue of the cooled air circulating therein at a positive pressure, which precludes entrance of sulfur particles to chamber 11. To maintain chamber 12 at a negative pressure, which insures that no sulfur particles escape from enclosure 10, fan 30 is designed to draw more air out of chamber 12 than is drawn into chamber 11 by blower 17. Thus, in addition to the air flowing into chamber 12 through opening 14, air is drawn into chamber 12 through opening 21. Fan 30 is also designed to provide sufficient circulation to thoroughly vent chamber 12 and to insure that the sulfur particles transported in conduits 29 and 31 are entrained in enough air so the lower explosive limit is not exceeded. Assuming a production rate of 18 tons of sulfur per hour, typically air would be drawn into enclosure 10 by blower 17 at a flow rate of 5000 standard cubic feet per minute (scfm), air would be drawn into chamber 12 through opening 21 at a flow rate of 2500 scfm, and air would be drawn out of chamber 12 by fan 30 at a flow rate of 7500 scfm. Conduit 31 is sufficiently long to thoroughly mix the air and sulfur particles and to transport the sulfur particles to a location a safe distance away from enclosure 10. The thorough mixing of the sulfur particles with air in conduit 31 and separator 32 also serves to further cool the sulfur particles and to oxidize the surface of the sulfur particles thereby eliminating surface tackiness and propensity to collect electrical charges. Thus, the particulate sulfur is more fluid and easier to handle and less likely to agglomerate or form lumps in storage.

Reference is made to FIGS. 2 and 3 for a description of atomizer 13. The upper end of shaft 15 protrudes through opening 14 to a point spaced upwardly from chamber 11, where it fits into a collet 40, which is welded to a disc-shaped mounting plate 41. Shaft 15 rotates about an axis 42. A disc-shaped impeller 43 is secured to mounting plate 41 by a plurality (e.g., five) of bolts 44. A cavity 45 is formed in the top of impeller 43. The bottom of cavity 45 has a conical surface. The base of a hollow conical member 46 is welded to the top surface of impeller 43. Cavity 45 and member 46 define a vessel having an open top into which the end of conduit 20 protrudes. Impeller 43 has a plurality (e.g., five) of bores 47 arranged in a ring and extending tangentially from the periphery of cavity 45 outwardly to the periphery of impeller 43. A nozzle 48 is secured in each of bores 47 by a threaded connection at 49. As illustrated in FIG. 3, the inlet of each nozzle 48 communicates with cavity 45 via bore 47, the outlet of each nozzle 48 opens into the region surrounding impeller 43, and a passage 50 extends through each nozzle 48 from its inlet to its outlet. Each nozzle 48 has a deflector 55 at its outlet. Axially adjustable screws 56, 57, and 58 extend normally from the surface of deflector 55 into the flow path at the outlet of each nozzle 48. A fan 59 lying above impeller 43 comprises a plurality (e.g., eight) of radial blades 60 welded to annular support plates 61 and 62. A fan lying below impeller 43 comprises a plurality (e.g., eight) of radial blades 64 welded to annular support plates 65 and 66. Fans 59 and 63 are secured to impeller 43 by a plurality (e.g., five) of bolts 67 and nuts 68, which clamp plates 62 and 65 to the side surfaces of impeller 43. Thus, all the parts of atomizer 13 are integral with each other and rotate with shaft 15.

Water is sprayed downwardly into the interior of fan 59 by a plurality of downwardly directed nozzles 75 distributed around a stationary feed ring 76, which surrounds conduit 20 above member 46. Water is fed to ring 76 through a pipe 77. Water is also sprayed upwardly into the interior of fan 63 by a plurality of nozzles 78 distributed around a stationary feed ring 79, which surrounds shaft 15. Water is fed to ring 79 through a pipe 80, which leads therefrom to a water main in the interior of chamber 11. Pipe 77 could also lead to the water main in the interior of chamber 11.

The parts of atomizer 13, including plate 41, impeller 43, member 46, and fans 59 and 63, as well as conduit 20, are coaxial with axis 42. Motor 16 drives shaft 15, so as to spin impeller 43 in a counterclockwise direction, as viewed in FIG. 3. Thus, bores 47 extend tangentially from the periphery of cavity 45 to the periphery of impeller 43 in a direction opposite to the direction of rotation of impeller 43. Molten sulfur is supplied to the vessel defined by cavity 45 and member 46 at a controlled rate, vis-a-vis, the angular velocity of impeller 43. The sulfur leaving conduit 20 flows outwardly in cavity 45 under the influence of the centrifugal force, aided by the conical bottom of cavity 45. Conduit 20 extends into the vessel far enough so the sulfur does not fly out as impeller 43 rotates. As the sulfur is spun by the rotation of impeller 43, it flows outwardly through bores 47 to the outlets of nozzles 48, where it is ejected into the air in the region surrounding atomizer 13.

Impeller 43 functions as the impeller of a centrifugal pump in imparting energy to the molten sulfur. However, in the preferred embodiment of the invention, the molten sulfur is supplied to impeller 43 at a controlled rate that is substantially lower than its maximum capacity to discharge molten sulfur as a centrifugal pump at the particular angular velocity and for the particular dimensions of impeller 43. Typically, the molten sulfur would be fed to impeller 43 at a rate of 20% to 25% of the maximum discharge capacity of impeller 43. For example, if impeller 43 is rotating at 2400 RPM, cavity 45 has a radius, designated X in FIG. 2, of 4 inches, the distance from axis 42 to the outlets of nozzles 48, designated Y in FIG. 2, is $10\frac{1}{2}$ inches, the diameter of nozzles 48, designated A in FIG. 2, is $\frac{1}{2}$ inch, and the diameter of bores 47, designated B in FIG. 2, is one inch, molten sulfur is typically supplied to atomizer 13 at a rate of 70 gallons per minute. As a result of the low controlled sulfur flow rate, air is drawn into the top of the vessel and thrown outwardly through bores 47 and nozzles 48 with the sulfur.

Bores 47 and nozzles 48 each comprise elongated conduits which, as depicted by the values of X and Y above and in FIG. 2, have a length greater than the radius of cavity 45. The bulk of the mass of spinning sulfur, which is located in cavity 45, presents a relatively small moment of inertia due to the radius of cavity 45, while the sulfur at the point of ejection from nozzles 48 has a relatively large tangential velocity due to the length of the conduits, i.e., bores 47 and nozzles 48. Thus, more efficient use can be made of the available motor power to atomize the molten sulfur into small particles, than when the conduits are smaller in length than the radius of the cavity.

As depicted by the values of A and B above and in FIG. 2, nozzles 48 are smaller in cross section than bores 47. As a result, nozzles 48 serve to accelerate the molten sulfur due to Bernoulli's principle. This also increases the extent of atomization for the available motor power.

As the molten sulfur is ejected from the outlets of nozzles 48 into the air surrounding impeller 43, it is atomized and rapidly cooled. Preferably, deflectors 55 are oriented so they do not block the passage of air across the outlets of nozzles 48, as impeller 43 spins; specifically, the preferred orientation of deflectors 55 directs the atomized sulfur leaving the outlets of nozzles 48 in a downward pattern in a direction of motion parallel to axis 42, as illustrated in FIG. 2. Fans 59 and 63 throw the adjacent air in an outward direction to further cool the atomized sulfur ejected from nozzles 48. Fans 59 and 63 typically move about 14,000 to 15,000 scfm of air. The cooled air from chamber 11 is thrown outwardly by fan 63. Water is injected into fans 59 and 63 by nozzles 75 and 78, respectively, at a controlled rate, e.g., 1 to 2 gallons per minute depending on the humidity, that will supersaturate with water vapor the air thrown out by fans 59 and 63, without forming water droplets. Care is taken that too much water is not injected; otherwise, the sulfur particles become undesirably wetted by the ejected water. The ejected water evaporates, cools the air, and thus serves to dissipate further the heat of the atomized sulfur. The combined effect of the air mixed with the molten sulfur in atomizer 13, the air normally occupying the region adjacent to impeller 43, the air thrown outwardly by fans 59 and 63 including the cooled air from chamber 11, and the water injected into fans 59 and 63 is to rapidly cool the atomized sulfur to form solid sulfur particles, i.e., to reduce the surface temperature of the sulfur preferably to approximately below 190° before the sulfur agglomerates appreciably. In other words, the atomized molten sulfur droplets ejected from nozzles 48 are rapidly cooled to form solid sulfur particles before the molten droplets have an opportunity to contact each other. As a result of the surface tension of the atomized molten surface, the solid particles have a smooth, round or pear-shaped configuration. The apparatus is designed so that sufficient cooling is provided to solidify the sulfur before it falls appreciably out of the influence of atomizer 13.

The particle size of the sulfur produced in the described manner can be closely controlled over a broad range. The primary control over particle size is exercised by the angular velocity of impeller 43, which typically would vary between 1800 and 3600 RPM. The higher the angular velocity of impeller 43, the smaller is the particle size of the sulfur. Secondary control over the particle size of the sulfur is exercised by varying the extent of protrusion of screws 56 through 58 into the flow path at the outlets of nozzles 48. For a given flow rate of sulfur and angular velocity of impeller 43, the thickness of the layer of sulfur-air mixture passing across the surface of deflectors 55 is predetermined. Protrusion of the screws 56 through 58 beyond the thickness of this layer does not exercise any further control over the size of the sulfur particles. Thereafter, further reductions in particle size must be effected by increasing the angular velocity of impeller 43. However, a substantial range of particle sizes can also be obtained at a single angular velocity by simply adjusting screws 56 through 58.

The viscosity of molten sulfur is directly related to its temperature, i.e., at temperatures slightly above its melting point, the viscosity of sulfur is low and it rises rapidly as the temperature increases. This characteristic of molten sulfur is used to advantage in the production of particulate sulfur according to the invention, because low viscosity and, thus better atomization, and low temperature and, thus less heat input, can simultaneously be achieved. Preferably, the temperature of the molten sulfur supplied to atomizer 13 would be between 250° and 300° F. This facilitates the rapid cooling of the atomized sulfur to solid particulate form, by minimizing the required heat dissipation, while handling the sulfur near its minimum viscosity.

Production of particulate sulfur in the described manner has a number of distinct advantages over prior art mechanical milling techniques.

First, the operation does not have to be carried out in an inert environment because of the minimal fire danger. Thus, the operation is preferably performed in a normal air environment.

Second, due to the rapid cooling of the sulfur, it does not agglomerate after formation of the particles, and the surface oxidizing gained by the air handling accomplishes the same effect previously gained by aging in a matter of seconds.

Third, the surface of the particulate sulfur is much smoother, rounder, and free of irregularities and corners than the sulfur particles produced by mechanical milling. Consequently, the particulate sulfur does not tend to collect static electric charges, and being smooth and round or pear-shaped, it has better flow and spreading characteristics.

Fourth, it is very easy to alloy or mix other substances, such as surfactants or water repellants with the particulate sulfur produced according to the invention. Surfactants such as Triton X114, alkyl benzene sulfonic acid, and sodium gluconate mixed with a water soluble gum to improve suspendability were effectively alloyed with particulate sulfur produced in the manner described above by introduction into the pump pit where it is mixed with the sulfur in molten form. Materials that may be adversely affected by the high temperature of the molten sulfur, may be introduced directly into the vessel of the atomizer by a conduit parallel to conduit 20. It may also be desirable to introduce sulfur particle coating materials such as water repellants in this manner rather than premixing with the molten sulfur.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, instead of mixing air with the sulfur in the atomizer, sulfur could be supplied to the atomizer at its maximum discharge capacity, thus providing a completely closed sulfur system without any air in the atomizer. In this case, all the atomizing and cooling of the sulfur would occur after the sulfur leaves the outlet of the nozzles, the cooling capacity of the apparatus would have to be increased accordingly, and the atomizing force might have to be supplemented. It would be obvious to one skilled in the art to readily recognize that to form certain grades of sulfur particles conventional, commercially available nozzles could sometimes be used.

What is claimed is:

1. Apparatus for transforming molten sulfur into solid sulfur particles of controlled size, the apparatus comprising:
   a source of molten sulfur;
   an atomizer having a periphery, a central cavity with a given radius, and one or more conduits leading from the cavity to the periphery of the atomizer, the one or more conduits each having an outlet and a length greater than the radius of the cavity;
   means for feeding the molten sulfur from the source into the cavity;
   means for spinning the atomizer to impart to the molten sulfur an outward motion ejecting the sulfur with sufficient force to atomize the sulfur;
   a deflector at the outlet of each conduit, the deflector being oriented to direct the atomized sulfur in a direction generally parallel to the axis of spinning of the atomizer;
   one or more elongated protrusions extending normally from each deflector to interrupt the flow at the outlet of each conduit; and
   means for cooling the atomized sulfur rapidly enough to form solid particles before the sulfur appreciably agglomerates.

2. The apparatus of claim 1, in which the atomizer comprises a vessel having an open top, a conical side converging toward the open top to define the cavity, and the molten sulfur supplying means comprising a conduit extending into the vessel through the open top.

3. The apparatus of claim 2, in which the one or more conduits extend tangentially from the periphery of the vessel interior in the direction opposite to the direction of spinning of the atomizer.

4. The apparatus of claim 1, in which the protrusions are axially adjustable to vary the extent of interruption of the flow at the outlet of each conduit.

5. The apparatus of claim 1, in which the cooling means includes means for injecting water into the air blown by the fan means at a sufficiently low rate to convert all the water to vapor.

6. Apparatus for producing particulate sulfur, the apparatus comprising:
   a source of sulfur;
   an atomizer having an axis of rotation, a cavity disposed on the axis of rotation, a plurality of nozzles arranged around the periphery of the atomizer, a conduit extending from the periphery of the cavity outwardly to each nozzle, the conduits lying approximately in a plane perpendicular to the axis of rotation, the nozzles being smaller in cross section than the conduit;
   means for rotationally driving the atomizer about the axis of rotation;
   means for feeding molten sulfur from the source to the cavity to impart to such molten sulfur an outward motion through the conduits and to eject such molten sulfur from the nozzles with increased velocity;
   a deflector disposed in front of each nozzle to intercept the molten sulfur ejected from such nozzle; and
   means for cooling the ejected sulfur to solidify it before appreciably agglomerating.

7. The apparatus of claim 6, in which the conduits extend straight tangentially from the periphery of the cavity outwardly to the periphery of the atomizer.

8. Apparatus for producing particulate sulfur, the apparatus comprising:
   a source of sulfur;
   an atomizer having an axis of rotation, a cavity disposed on the axis of rotation, a plurality of conduits extending tangentially from the periphery of the cavity outwardly to outlets at the periphery of the atomizer, the conduits lying approximately in a plane perpendicular to the axis of rotation, and a deflector disposed in front of each outlet to intercept molten sulfur ejected from such outlet;
   means for rotationally driving the atomizer about the axis of rotation;
   means for feeding molten sulfur from the source to the cavity to impart to such molten sulfur an outward motion through the conduits and to eject such molten sulfur from the outlets against the deflectors; and
   means for cooling the ejected sulfur to solidify it before appreciably agglomerating.

9. The apparatus of claim 8, additionally comprising one or more axially adjustable protrusions on each deflector.

* * * * *